US012246543B2

(12) United States Patent
Aizawa

(10) Patent No.: US 12,246,543 B2
(45) Date of Patent: Mar. 11, 2025

(54) DIELECTRIC HEATING DEVICE AND LIQUID EJECTION SYSTEM

(71) Applicant: SEIKO EPSON CORPORATION, Tokyo (JP)

(72) Inventor: Tadashi Aizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 85 days.

(21) Appl. No.: 18/358,989

(22) Filed: Jul. 26, 2023

(65) Prior Publication Data

US 2024/0034072 A1 Feb. 1, 2024

(30) Foreign Application Priority Data

Jul. 28, 2022 (JP) ................................. 2022-120309

(51) Int. Cl.

| | |
|---|---|
| ***B41J 2/355*** | (2006.01) |
| ***B41J 2/01*** | (2006.01) |
| ***B41J 2/36*** | (2006.01) |
| ***B41J 11/00*** | (2006.01) |

(52) U.S. Cl.

CPC ............... *B41J 2/3558* (2013.01); *B41J 2/01* (2013.01); *B41J 2/36* (2013.01); *B41J 11/002* (2013.01)

(58) Field of Classification Search

CPC ..... B41J 2/3558; B41J 2/01; B41J 2/36; B41J 11/002

See application file for complete search history.

(56) References Cited

U.S. PATENT DOCUMENTS 3,470,621 A * 10/1969 Bennett ..................... F26B 3/34 219/773

FOREIGN PATENT DOCUMENTS

| | | | | | |
|---|---|---|---|---|---|
| JP | 2011-037228 | A | | 2/2011 | |
| JP | 2018130944 | A | * | 8/2018 | B41J 2/01 |
| JP | 2021008056 | A | * | 1/2021 | B41J 11/002 |
| KR | 20050076822 | A | * | 7/2005 | G03G 15/20 |

* cited by examiner

*Primary Examiner* — Yaovi M Ameh

(74) *Attorney, Agent, or Firm* — Global IP Counselors, LLP

(57) ABSTRACT

A heating control section for controlling a voltage applying section and a moving section for reciprocate a carriage on which the first electrode unit is mounted executes heating control for heating a medium while moving the first electrode unit in a scanning direction in at least one of an outgoing path in which the first electrode unit moves in one direction of the scanning direction and a return path in which the first electrode unit moves in the opposite direction. In the heating control, when the first electrode unit is positioned at a first point overlapping with one end section of the medium, the heating control section sets the electric field strength of the first electrode unit to a first electric field strength, when that is positioned at a second point overlapping with center portion of the medium, the second electric field strength is set to be stronger than the first electric field strength, and the movement speed of the first electrode unit at the first point is slower than the movement speed at the second point.

9 Claims, 10 Drawing Sheets

DIELECTRIC HEATING DEVICE AND LIQUID EJECTION SYSTEM

The present application is based on, and claims priority from JP Application Serial Number 2022-120309, filed Jul. 28, 2022, the disclosure of which is hereby incorporated by reference herein in its entirety.

BACKGROUND

1. Technical Field

The present disclosure relates to a dielectric heating device and a liquid ejection system.

2. Related Art

With regard to the dielectric heating device, JP-A-2011-37228 describes a drying unit having a plurality of microwave-irradiation devices. The drying unit is fixed to the main body of the inkjet printer, and has such a length that the entire width of the printing area of the printing material in the main scanning direction can be heated and dried. In the drying unit, a plurality of microwave-irradiation devices are disposed in the main scanning direction.

In JP-A-2011-37228, as the width of the printing material to be heated becomes larger, it is necessary to enlarge the size of the microwave-irradiating devices or to increase the number of microwave-irradiating devices. Therefore, it has been studied to suppress such an increase in size or the like by mounting the dielectric heating device on a carriage configured to be capable of reciprocating along a width direction. However, in this case, for example, a variation in a heating amount in a movement direction of the carriage may occur due to a change in the movement speed of the carriage or a change in the direction of the carriage.

SUMMARY

According to a first aspect of the present disclosure, a dielectric heating device is provided. A dielectric heating device includes a first electrode unit that has a first electrode and a second electrode facing a medium and that heats the medium by a dielectric heating method; a voltage applying section that applies an AC voltage to the first electrode and the second electrode; a carriage on which is mounted the first electrode unit; a moving section that causes the first electrode unit to reciprocally move at least above the medium along a scanning direction by reciprocating the carriage along the scanning direction; and a heating control section that controls the voltage applying section and the moving section, wherein the heating control section executes heating control of heating the medium while moving the first electrode unit along the scanning direction in at least one of an outgoing path in which the first electrode unit moves in one direction of the scanning direction and a return path in which the first electrode unit moves in a direction opposite to the one direction and in the heating control, the heating control section sets an electric field strength formed by the first electrode unit when the first electrode unit is positioned at a first point overlapping one end section of the medium in the scanning direction to a first electric field strength, sets an electric field strength formed by the first electrode unit when the first electrode unit is positioned at a second point overlapping a center section of the medium in the scanning direction to a second electric field strength that is stronger than the first electric field strength, and causes movement speed of the first electrode unit at the first point to be slower than movement speed of the first electrode unit at the second point.

According to a second aspect of the present disclosure, a liquid ejection system is provided. A liquid ejection system includes the dielectric heating device of the above embodiment; a liquid ejection section that has an ejection surface having a nozzle opening formed therein and that ejects and applies liquid onto the medium from the nozzle opening; and a ejection control section that controls the liquid ejection section.

DESCRIPTION OF EMBODIMENTS

A. First Embodiment

Figure 1:
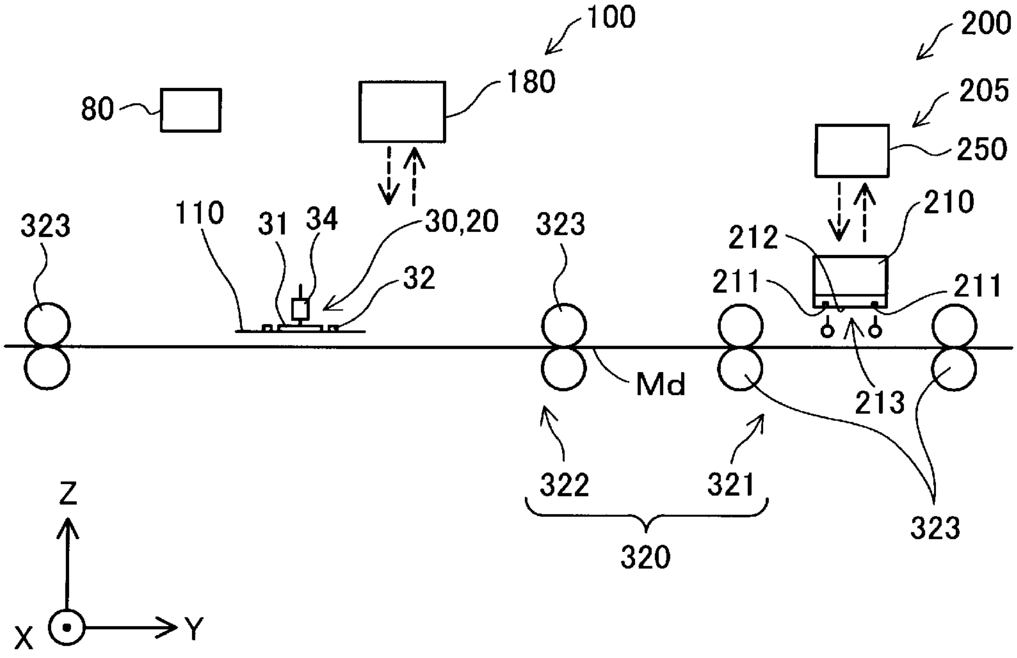
FIG. 1 is a schematic view showing a schematic configuration of a liquid ejection system as a first embodiment.

FIG. 1 is a schematic view showing a schematic configuration of a liquid ejection system 200 as a first embodiment. FIG. 1 shows arrows indicating the mutually orthogonal X, Y and Z directions. The X direction and the Y direction are directions parallel to a horizontal plane, and the Z direction is a direction along a vertically upward direction. The arrows indicating the X, Y, and Z directions are appropriately shown in other drawings such that the indicated directions correspond to FIG. 1. In the following description, when specifying the direction, the direction indicated by the arrow in each drawing is referred to as "+" and a direction opposite thereto is referred to as "−", and both positive and negative signs are used in the direction notation. Hereinafter, the +Z direction is also referred to as "upper" and the −Z direction is also referred to as "lower". In this specification, the term "orthogonal" includes a range of 90°±10°.

The liquid ejection system 200 includes a dielectric heating device 100 having an electrode unit 20, and a liquid ejection device 205. The liquid ejection system 200 according to the present embodiment further includes a transport section 320. The liquid ejection system 200 ejects and applies liquid to a medium Md using the liquid ejection device 205 while transporting the medium Md using the transport section 320, and heats and dries the liquid applied to the medium Md using the electrode unit 20 of the dielectric heating device 100. It can also be said that the liquid ejection device 205 applies the liquid to be heated by the electrode unit 20 onto the medium Md. The electrode unit 20 is also referred to as a heater.

As the medium Md, for example, paper, cloth, film, or the like is used. The cloth used as the medium Md is formed by weaving, for example, fibers such as cotton, hemp, polyester, silk, and rayon, or mixed fibers thereof. In the present embodiment, a sheet-like cotton fabric is used as the medium Md. As the liquid to be applied to the medium Md, for example, various types of ink are used. In the present embodiment, an aqueous ink containing water as a main component is used as the liquid. In the present specification, the main component of the liquid refers to a substance having a mass fraction of 50% or more among substances contained in the liquid. In another embodiment, an arbitrary liquid other than ink may be used as the liquid, for example, various coloring materials, electrode materials, samples such as biological organic substances and inorganic substances, lubricating oil, resin liquid, etching liquid, and the like.

The transport section 320 transports the medium Md. In the present embodiment, the transport section 320 is configured as a roller mechanism that transports the medium Md by driving rollers 323. The transport section 320 includes a first transport section 321 that is provided in the liquid ejection device 205 and that transports the medium Md in the liquid ejection device 205, and a second transport section 322 that is provided in the dielectric heating device 100 and that transports the medium Md in the dielectric heating device 100. Each of the first transport section 321 and the second transport section 322 includes the rollers 323 and a driving section (not shown) configured by a motor or the like for driving the rollers 323. In another embodiment, the transport section 320 may be configured as a belt mechanism that transports the medium Md by driving a belt, for example.

The first transport section 321 is disposed at a position in the +Y direction of the second transport section 322. In the present embodiment, the first transport section 321 and the second transport section 322 execute intermittent transport that intermittently transports the sheet-like medium Md in the −Y direction. More specifically, the first transport section 321 and the second transport section 322 alternately repeat a transport operation in which the rollers 323 are operated to transport the medium Md in the −Y direction by a predetermined transporting distance and a stationary operation in which the rollers 323 are not operated, that is, the medium Md is stopped without being transported. A direction in which the medium Md is transported by the transport section 320 is also referred to as a transport direction. The transport direction is a direction, which intersects a scanning direction (to be described later), and is the −Y direction in this embodiment.

In the present embodiment, the liquid ejection device 205 is configured as an inkjet printer that performs printing by ejecting and applying ink as a liquid to the medium Md. Therefore, it can be said that the liquid ejection system 200 is configured as a printing system including the inkjet printer. The liquid ejection device 205 includes a liquid ejection section 210 that ejects and applies the liquid to the medium Md, an ejection control section 250, and the above described first transport section 321.

The liquid ejection section 210 is configured as, for example, a piezoelectric or thermal liquid discharge head, and includes one or more head chips (not shown). Each head chip has a nozzle surface 212 in which nozzle openings 211, which are openings of the nozzles for ejecting liquid, are formed. Each nozzle surface 212 constitutes an ejection surface 213 of the liquid ejection section 210. That is, it can also be said that the liquid ejection section 210 has the ejection surface 213 in which the nozzle openings 211 are formed. The liquid ejection section 210 ejects and applies ink as liquid to the medium Md from the nozzle openings 211. The colors of the inks ejected from the head chips of the liquid ejection section 210 may be the same or different from each other. In addition, the liquid ejection section 210 may be configured to be capable of reciprocating with respect to the medium Md in a direction that is perpendicular to the Z direction and that intersects with the Y direction, or may be configured as a so-called line head in which a position is fixed without reciprocating with respect to the medium Md.

The ink used as the liquid in the present embodiment is a pigment ink containing a resin. The resin contained in the ink has an action of firmly fixing the pigment on the medium Md via itself. Such a resin is used, for example, in a state in which a resin slightly soluble or insoluble in a solvent such as water is made into fine particles and dispersed in the solvent, that is, in an emulsion state or a suspension state. Examples of such a resins include acrylic resin, styrene acrylic resin, fluorene resin, urethane resin, polyolefin resin, rosin modified resin, terpene resin, polyester resin, polyamide resin, epoxy resin, vinyl chloride resin, vinyl chloride-vinyl acetate copolymer, ethylene-vinyl acetate, and the like. Two or more of these resins may be used in combination.

The ejection control section 250 is configured by a computer including one or a plurality of processors, a storage device, and an input/output interface that performs input and output of signals with the outside. The ejection control section 250 according to the present embodiment controls the liquid ejection section 210 and the first transport section 321 to eject and apply the liquid to the medium Md while transporting the medium Md in the −Y direction. More specifically, the ejection control section 250 performs the above described printing on the medium Md while repeating discharging the liquid to the medium Md during the stationary operation by the first transport section 321 and moving the medium Md in the −Y direction by the transport operation by the first transport section 321. In another embodiment, the ejection control section 250 may be configured by a combination of a plurality of circuits, for example.

Figure 2:
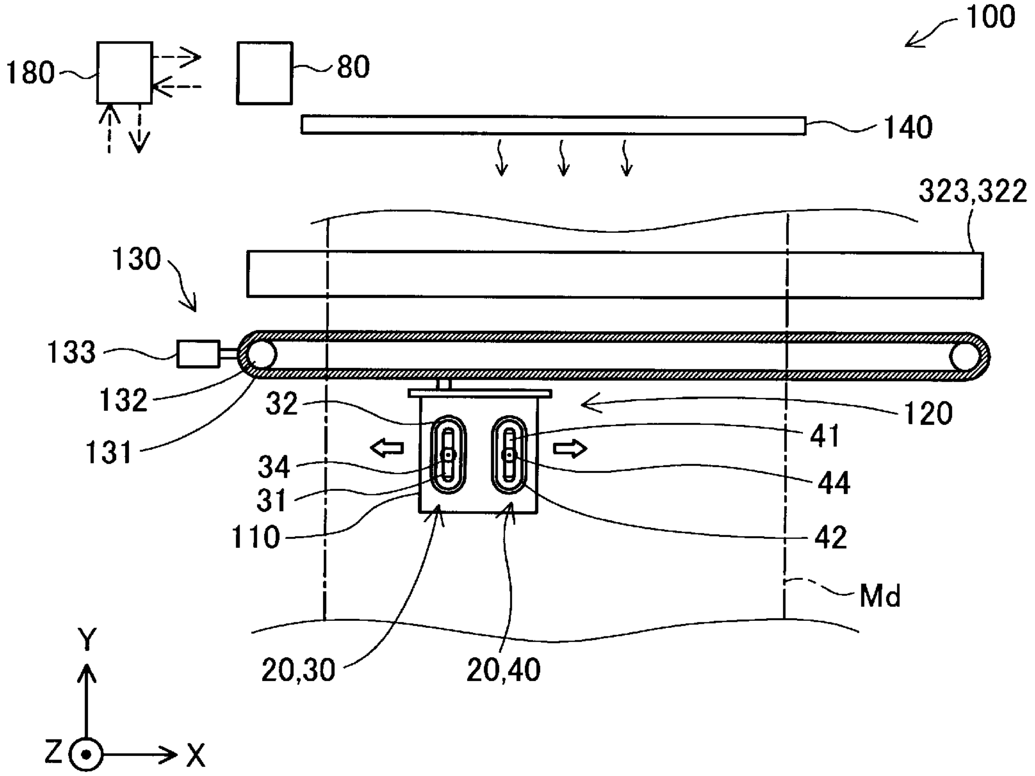
FIG. 2 is a top view showing a schematic configuration of a dielectric heating device according to the first embodiment.

FIG. 2 is a top view showing a schematic configuration of the dielectric heating device 100 according to the first embodiment. As shown in FIGS. 1 and 2, the dielectric heating device 100 includes the electrode unit 20 for heating the medium Md by a dielectric heating method, a voltage applying section 80 for applying an AC voltage to the electrode unit 20, a carriage 120 on which is mounted the electrode unit 20, a moving section 130 for reciprocally moving the carriage 120, a heating control section 180, and the above described second transport section 322. In addition, the dielectric heating device 100 according to the present embodiment is provided with an airflow generation section 140 for generating an airflow. The airflow generation section 140 according to the present embodiment is configured as a blower for blowing air toward the medium Md. By the airflow generation section 140 can promote drying of the medium Md and can appropriately promote cooling of the medium Md, for example. In FIG. 1, the carriage 120, the moving section 130, and the airflow generation section 140 are omitted.

The dielectric heating device 100 according to the present embodiment heats and dries the medium Md by heating the medium Md with an AC electric field generated from the electrode unit 20 while the medium Md is transported by the second transport section 322 and the carriage 120 is reciprocally moved by the moving section 130 to reciprocally move the electrode unit 20 above the medium Md. "Heating the medium Md by the AC electric field" includes not only using the AC electric field to heat the medium Md itself but also using the AC electric field to heat a liquid or other deposited substance, or a solid adhering on the medium Md.

The voltage applying section 80 is electrically connected to a first electrode 31 and a second electrode 32 of a first electrode unit 30 (to be described later). In this embodiment, the voltage applying section 80 is also electrically connected to a third electrode 41 and a fourth electrode 42 of a second electrode unit 40 (to be described later). Hereinafter, the first electrode unit 30 and the second electrode unit 40 may be simply referred to as the electrode units 20 without distinguishing between them. In this embodiment, the electrode units 20 are electrically connected to each other in parallel.

The voltage applying section 80 applies an AC voltage having a predetermined drive frequency $f_0$ to each electrode of each electrode unit 20. In the present embodiment, the voltage applying section 80 is configured as a high-frequency power supply including a high-frequency voltage generation circuit, and includes a crystal oscillator, a phase locked loop (PLL) circuit, and a power amplifier, which are not shown. In another embodiment, the voltage applying section 80 may be configured as an inverter including a switching circuit having a switching element such as a transistor, for example. One of the potentials applied to the first electrode 31 and the second electrode 32 may be a reference potential. Similarly, one of the potentials applied to the third electrode 41 and the fourth electrode 42 of the second electrode unit 40 may be the reference potential.

In the present embodiment, a high-frequency voltage is applied to each electrode of each electrode unit 20. In this specification, "high frequency" refers to a frequency of 1 MHz or more. More specifically, in the present embodiment, 13.56 MHz, which is one of industrial scientific and medical (ISM) bands, is used as the drive frequency $f_0$. Since the dielectric loss tangent of water becomes maximum near 20 GHz, the liquid adhering to the medium Md can be heated more efficiently by applying a high-frequency voltage of 2.45 GHz or 5.8 GHz among in the ISM band to each electrode of electrode units 20. On the other hand, from the viewpoint of heating the ink, even when the drive frequency $f_0$ is relatively low, for example, 13.56 MHz or 40.68 MHz, it is possible to obtain good heating efficiencies. This is because when the drive frequency $f_0$ dis 13.56 MHz or 40.68 MHz, while the dielectric loss tangent of water in the ink is low, Joule heat that causes dye components or the like in the ink to become electric resistance is likely to occur.

The heating control section 180 is configured by a computer in the same manner as the ejection control section 250 described above. The heating control section 180 controls the voltage applying section 80, the moving section 130, and the second transport section 322.

In this embodiment, the heating control section 180 controls the voltage applying section 80 to individually adjust the voltage applied to the first electrode unit 30 and the voltage applied to the second electrode unit 40. The heating control section 180, for example, can individually adjust each voltage applied to each electrode unit 20 by individually adjusting each resistance value of a variable resistor (not shown) electrically connected in series to each of the first electrode unit 30 and the second electrode unit 40. Thus, the heating control section 180 can individually adjust the electric field strength formed by each electrode unit 20. For example, the heating control section 180 increases the voltage applied to the first electrode unit 30 when increasing the electric field strength formed by the first electrode unit 30, and increases the voltage applied to the second electrode unit 40 when increasing the electric field strength formed by the second electrode unit 40.

As described above, the dielectric heating device 100 according to the present embodiment includes the first electrode unit 30 and the second electrode unit 40 as the electrode units 20. Both the first electrode unit 30 and the second electrode unit 40 are mounted on the carriage 120. More specifically, in the present embodiment, a substrate 110 to which the first electrode unit 30 and the second electrode unit 40 are fixed is supported by the carriage 120, whereby the first electrode unit 30 and the second electrode unit 40 are mounted on the carriage 120. The second electrode unit 40 is disposed on the +X direction side of the first electrode unit 30.

The moving section 130 causes the carriage 120 to reciprocate along the scanning direction, thereby causing the first electrode unit 30 and the second electrode unit 40 to reciprocate at least above the medium Md. The scanning direction includes both a direction to one side and a direction opposite thereto along the same axis, and is the X direction in this embodiment. The direction to one side of the scanning direction is also referred to as a positive direction, and the opposite direction is also referred to as a negative direction. In the present embodiment, the positive direction of the scanning direction is the +X direction, and the negative direction of the scanning direction is the −X direction. The moving section 130 according to the present embodiment is configured as a belt mechanism including an endless belt 131 to which the carriage 120 is fixed, a pulley 132, and a driving section 133 configured by a motor or the like. In another embodiment, the moving section 130 may be constituted by, for example, a ball screw mechanism. Hereinafter, the movement of the carriage 120 and the electrode units 20 in the scanning direction is also referred to as scanning of the carriage 120 and the electrode units 20.

Figure 3:
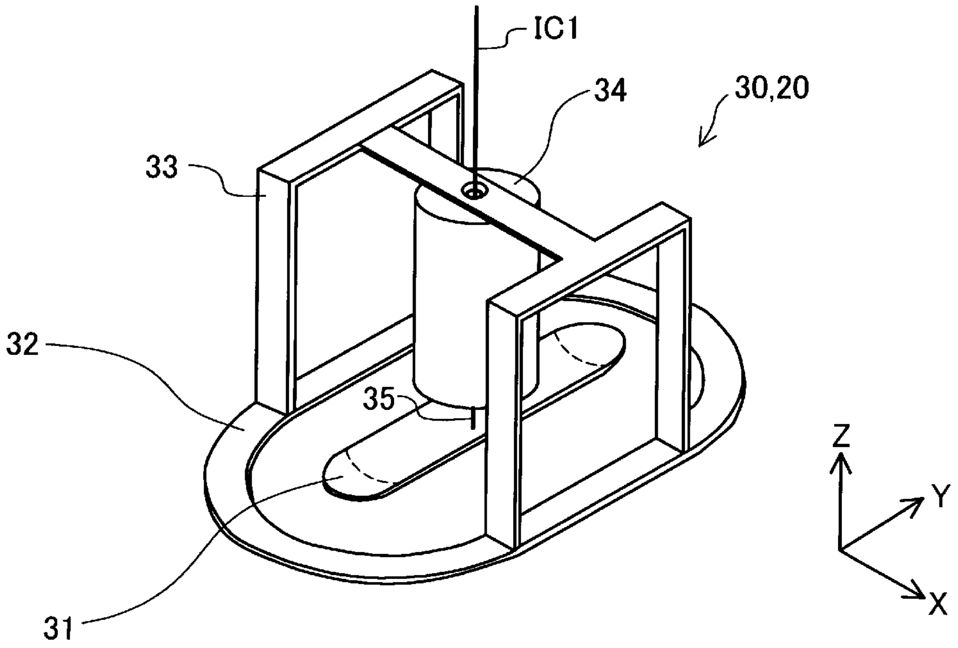
FIG. 3 is a perspective view showing a schematic configuration of the electrode unit.

FIG. 3 is a perspective view showing a schematic configuration of the electrode unit 20 according to the present embodiment. More specifically, FIG. 3 shows the first electrode unit 30. The first electrode unit 30 includes the first electrode 31, the second electrode 32, and a first coil 34. The second electrode unit 40 includes a third electrode 41, a fourth electrode 42, and a second coil 44. In this embodiment, the first electrode unit 30 and the second electrode unit 40 are configured similarly to each other. More specifically, the first electrode 31 and the third electrode 41 have the same configuration. The second electrode 32 and the fourth electrode 42 have the same configuration. The first coil 34 and the second coil 44 have the same configuration. Hereinafter, the first coil 34 and the second coil 44 are also simply referred to as coils without distinguishing between them.

The first electrode 31 and the second electrode 32 are conductors, and are formed of, for example, a metal, an alloy, a conductive oxide, or the like. The first electrode 31 and the second electrode 32 may be formed of the same material, or may be formed of different materials. For example, the first electrode 31 and the second electrode 32 may be disposed on a substrate or the like formed of a material having low dielectric loss tangent and low conductivity, or may be supported by another member, for the purpose of maintaining posture and strength thereof.

The first electrode 31 and the second electrode 32 face the medium Md in the Z direction. More specifically, as shown in FIG. 1, in the present embodiment, the first electrode 31 and the second electrode 32 are disposed above the medium Md. Therefore, in the present embodiment, the lower surfaces of the first electrode 31 and the second electrode 32 face the upper surface of the medium Md. The substrate 110 is disposed between the medium Md, and the first electrode 31 and the second electrode 32. A direction in which the medium Md faces the first electrode 31 and the second electrode 32 is also referred to as a facing direction.

The first electrode 31 and the second electrode 32 are arranged such that the shortest distance between the first electrode 31 and the second electrode 32 is one tenth or less of the wavelength of an electromagnetic field output from the first electrode unit 30. The first electrode 31 according to the present embodiment has a boat-shape having a longitudinal direction along the Y direction and a transverse direction along the X direction. The lower surface of the first electrode 31 has a curved surface shape that is convex toward the −Z direction side. The first electrode 31 has an oval shape with the Y direction as a longitudinal direction as viewed along the Z direction.

The second electrode 32 has an elongated annular shape which is flat in the X and Y directions and has the Y direction as the longitudinal direction. The second electrode 32 is disposed so as to surround the periphery of the first electrode 31 as viewed along the Z direction. When it is said that "the second electrode 32 is disposed so as to surround the first electrode 31 as viewed along the Z direction", it is sufficient that the second electrode 32 be disposed so as to surround half or more of the periphery of the first electrode 31 as a whole as viewed along the Z direction, and it is not necessary that the second electrode 32 surrounds the entire periphery of the first electrode 31 without any gaps. Therefore, according to another embodiment, the second electrode 32 may have, for example, a so-called C-shape or U-shape as viewed along the Z direction. In addition, for example, as viewed along the Z direction, the second electrode 32 may have a shape that surrounds the first electrode 31 as a whole while being interrupted intermittently. In this case, the second electrode 32 is configured such that the same potential is applied to each portion of the second electrode 32 when an AC voltage is applied to the first electrode 31 and the second electrode 32.

As shown in FIGS. 1 and 2, both the first electrode 31 and the second electrode 32 are fixed on the substrate 110, which is disposed parallel to the X direction and the Y direction. More specifically, the first electrode 31 is disposed such that a central portion in the X direction and the Y direction of the lower surface of the first electrode 31 is in contact with the upper surface of the substrate 110. The second electrode 32 is arranged such that the lower surface of the second electrode 32 is in contact with the upper surface of the substrate 110. Therefore, according to the present embodiment, the central portion of the lower surface of the first electrode 31 and the lower surface of the second electrode 32 are disposed on the same plane. According to the present embodiment, the substrate 110 is provided commonly to the first electrode unit 30 and the second electrode unit 40.

According to the present embodiment, the substrate 110 is formed of glass. The substrate 110 suppresses adhesion of the liquid, such as the ink applied to the medium Md, to the first electrode 31 and the second electrode 32 and, when the medium Md is cloth, of adhesion of fluff of the medium Md to the first electrode 31 and the second electrode 32. According to the present embodiment, the substrate 110 also suppresses adhesion of liquid and fluff to the third electrode 41 and the fourth electrode 42 of the second electrode unit 40 in the same manner as described above. According to other embodiments, the substrate 110 may be formed of, for example, alumina.

The description will return to FIG. 3. In this embodiment, the first electrode 31 is electrically connected to the voltage applying section 80 via an electrical wire 35, the first coil 34, and the inner conductor IC1 of a coaxial cable. The second electrode 32 is electrically connected to the voltage applying section 80 via a connecting member 33 disposed on the second electrode 32, an outer conductor of a coaxial cable (not shown), or the like.

When the AC voltage having the drive frequency $f_0$ is applied to the first electrode 31 and the second electrode 32, an electromagnetic field having wavelengths according to the drive frequency $f_0$ is generated from the first electrode 31 and the second electrode 32. The strength of the electromagnetic field is very strong near the first electrode 31 and the second electrode 32, and is very weak at a distance. According to the present specification, an electromagnetic field generated near the first electrode 31 and the second electrode 32 by application of an AC voltage is also referred to as a "near electromagnetic field". The "near" of the first electrode 31 and the second electrode 32 refers to a range in which the distance from the first electrode 31 and the second electrode 32 is equal to or less than $1/2\pi$ of the wavelength of the generated electromagnetic field. A range farther than the "near" is also referred to as "far". In addition, according to the present specification, an electromagnetic field generated far from the first electrode 31 and the second electrode 32 by application of an AC voltage is also referred to as a "far electromagnetic field". The far electromagnetic field corresponds to an electromagnetic field used for communication by a general communication antenna or the like.

As described above, the first electrode 31 and the second electrode 32 are arranged such that the shortest distance between them is one tenth or less of the wavelength of the electromagnetic field. Accordingly, the density of the electromagnetic field generated from the first electrode 31 and the second electrode 32 can be attenuated near the first electrode 31 and the second electrode 32. Therefore, by appropriately maintaining the distance between the medium Md, and the first electrode 31 and the second electrode 32, it is possible to suppress radiation of the far electromagnetic field from the first electrode 31 and the second electrode 32 while efficiently heating the liquid adhering to the medium Md by the electric field generated near the first electrode 31 and the second electrode 32. In particular, according to the present embodiment, since the second electrode 32 is disposed so as to surround the first electrode 31 as viewed along the Z direction, radiation of the far electromagnetic field from the first electrode 31 and the second electrode 32 can be further suppressed.

In this embodiment, one end of the first coil 34 is electrically connected in series with the first electrode 31 through the electrical wire 35, and the other end is electrically connected in series with the voltage applying section 80 shown in FIGS. 1 and 2. According to the present embodiment, the first coil 34 is configured of a solenoid coil, and is arranged so that its length direction is along the Z direction. The shape, length, cross-sectional area, number of turns, material and the like of the first coil 34 are selected, for example, according to the drive frequency $f_0$, or so as to realize impedance matching between the first electrode unit 30 and the voltage applying section 80. According to another embodiment, one end of the first coil 34 may be connected in series with the second electrode 32 instead of the first electrode 31.

By the voltage applying section 80 applying an AC voltage to the first electrode unit 30, a high voltage is generated at one end of the first coil 34. Accordingly, the strength of the electric field generated from the first electrode 31 and the second electrode 32 can be increased. The first coil 34 is desirably disposed so that the distance between one end of the first coil 34 and the first electrode 31 is as small as possible. When the distance between the one end of the first coil 34 and the first electrode 31 is large, the high voltage generated at the one end of the first coil 34 may generate an electric field between the first coil 34 and the first electrode 31 or between the electrical wire 35 and the second electrode 32 that does not contribute to the heating of the medium Md, and may reduce the effect of increasing the strength of the electric field generated from the first electrode 31 and the second electrode 32. On the other hand, by making the distance between one end of the first coil 34 and the first electrode 31 small, it is possible to suppress generation of such an electric field that does not contribute to the heating of the medium Md, and therefore it is possible to effectively increase the strength of the electric field generated from the first electrode 31 and the second electrode 32. According to another embodiment, the first electrode unit 30 may not have the first coil 34, and for example, by forming the first electrode 31 in a meandering shape, the first electrode 31 may exhibit the same function as a coil.

The above described heating control section 180 executes heating control in at least one of an outgoing path and a return path of the first electrode unit 30. The heating control refers to control for heating the medium Md while moving the first electrode unit 30 along the X direction, which is the scanning direction. The outgoing path refers to a path in which the first electrode unit 30 moves in one direction of the scanning direction. The return path refers to a path in which the first electrode unit 30 moves in a direction opposite to the one direction of the scanning directions. According to the present embodiment, the heating control section 180 executes the heating control in both the outgoing path and the return path. Hereinafter, the heating control executed in the outgoing path is also referred to as a first control, and the heating control executed in the return path is also referred to as a second control.

Figure 4:
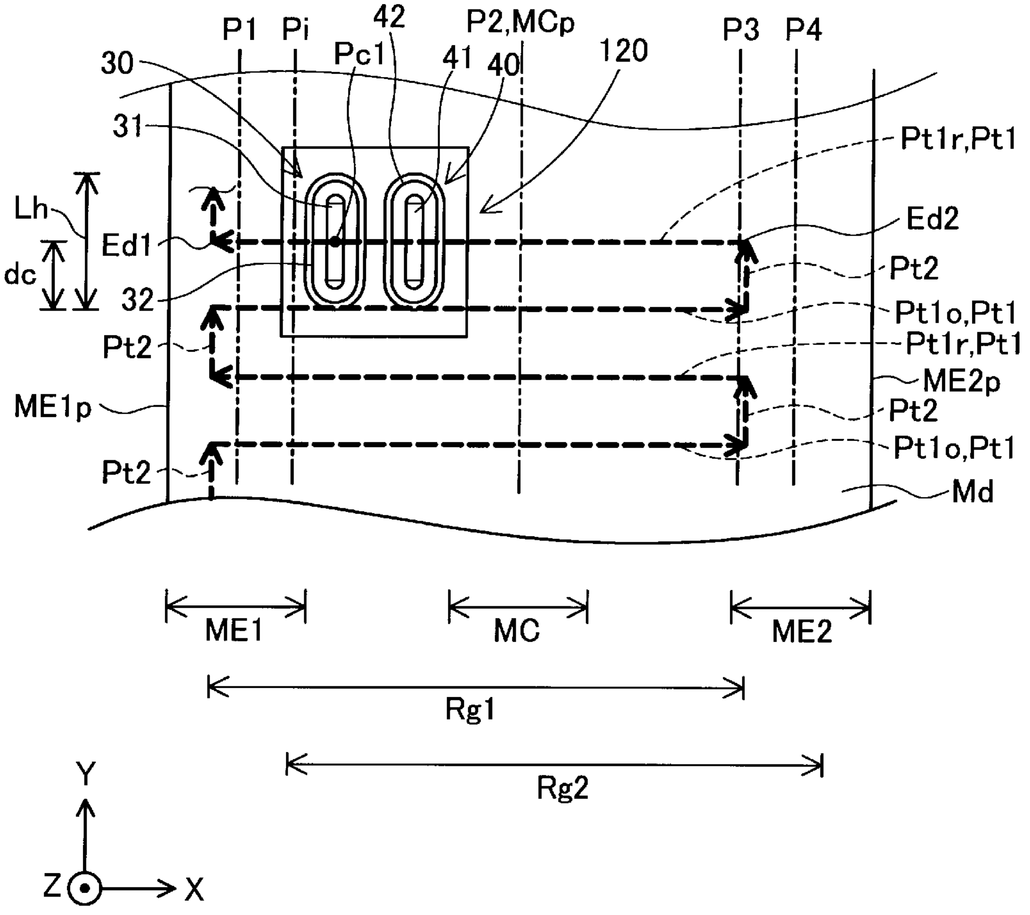
FIG. 4 is an explanatory view showing movement of a carriage according to the first embodiment.

FIG. 4 is an explanatory view showing the movement of the carriage 120 according to the present embodiment. FIG. 4 schematically shows a first movement path Pt1 and a second movement path Pt2. The first movement path Pt1 represents a path in the reciprocal movement of the carriage 120 along the X direction. The second movement path Pt2 represents a path of relative movement of the carriage 120 with respect to the medium Md along the Y direction. In FIG. 4, the second movement path Pt2 is represented as a path of movement of the carriage 120 to the +Y direction side, but actually, as described above, the medium Md is moved to the −Y direction side with respect to the carriage 120 by the second transport section 322. In FIG. 4, the first movement path Pt1 and the second movement path Pt2 are represented as movement paths of the center position Pc in the X direction and the Y direction of the first electrode unit 30 mounted on the carriage 120. More specifically, the center position Pc corresponds to a center position of the first electrode 31 in the X-direction and the Y-direction. According to the present specification, the center position Pc is also referred to as a "position of the carriage 120" or a "carriage position".

As shown in FIG. 4, the heating control section 180 according to the present embodiment alternately executes the above described transport operation and stationary operation by controlling the second transport section 322. Then, the heating control section 180 executes at least one of the first control and the second control while executing one stationary operation. More specifically, according to the embodiment, the heating control section 180 executes only one of the first control and the second control in one stationary operation, and alternately executes the first control and the second control. Therefore, according to the present embodiment, the second movement path Pt2 has a path that connects the terminal end of the outgoing path Pt1*o* of the first movement path Pt1 and the starting end of the return path Pt1*r* of the first movement path Pt1, and a path that connects the terminal end of the return path Pt1*r* and the starting end of the outgoing path Pt1*o*. According to this embodiment, the outgoing path Pt1*o* is a path extending from the end Ed1 on the −X direction side to the end Ed2 on the +X direction side of the first movement path Pt1. The return path Pt1*r* is a path from the end Ed2 toward the end Ed1. The length of each second movement path Pt2 is equal to the transporting distance dc.

FIG. 4 shows a first point P1, a second point P2, and a third point P3 on the movement path of the first electrode unit 30 along the X direction, that is, on the first movement path Pt1. FIG. 4 shows a fourth point P4 on the movement path along the X direction of the second electrode unit 40 (not shown). The first point P1 is a point overlapping with one end section ME1 of the medium Md in the X direction as viewed along the Z direction. That is, when the first electrode unit 30 is positioned at the first point P1, it can be also said that the center position Pc of the first electrode unit 30 overlaps the one end section ME1. The second point P2 is a point that overlaps with the center section MC of the medium Md in the X direction as viewed along the Z direction. The third point P3 and the fourth point P4 are points overlapping with the other end section ME2 of the medium Md in the X direction as viewed along the Z direction. According to the present embodiment, when the first electrode unit 30 is positioned at the third point P3, the second electrode unit 40 is positioned at the fourth point P4. In addition, when the first electrode unit 30 is positioned at the first point P1, the second electrode unit 40 is positioned at a point Pi overlapping the one end section ME1. When it is said that "the second electrode unit 40 is positioned at a certain point", it means that the center position of the second electrode unit 40 in the X-direction and the Y-direction is positioned at the point.

As shown in FIG. 4, the one end section ME1 of the medium Md is positioned outside the center section MC in the X direction, and includes one end ME1*p* of the medium Md in the X direction. The one end section ME1 overlaps the second movement path Pt2 as viewed along the Z-direction. More specifically, as viewed along the Z direction, the one end section ME1 overlaps a path of the second movement path Pt2 that connects an end point of the return path Pt1*r* and a start point of the outgoing path Pt1*o*. The center section MC includes a center point MCp of the medium Md in the X direction. The second point P2 according to the present embodiment corresponds to the center point MCp. The other end section ME2 of the medium Md is positioned outside of the center section MC in the X direction, and includes other end ME2*p* of the medium Md in the X direction. According to the present embodiment, as viewed along the Z direction, the other end section ME2 overlaps a path of the second movement path Pt2 that connects the end point of the outgoing path Pt1*o* and the start point of the return path Pt1*r*. According to the embodiment, the one end ME1*p* is positioned further to the −X direction side than the other end ME2*p*. Further, according to the embodiment, the width of each of the one end section ME1, the other end section ME2, and the center section MC in the X direction is defined as the width that coincides with the distance between the end of the second electrode 32 of the first electrode unit 30 on the −X direction side and the end of the fourth electrode 42 of the second electrode unit 40 on the +X direction side. Note that in another embodiment, as long as the one end section ME1 and the other end section ME2 are positioned outside the center section MC in the X direction, the widths of the one end section ME1, the other end section ME2, and the center section MC in the X direction are not particularly limited.

As shown in FIG. 4, according to the embodiment, the first point P1 is positioned outside the movement range Rg2 of the second electrode unit 40 in the X direction. The fourth point P4 is positioned outside the movement range Rg1 of the first electrode unit 30 in the X direction.

Figure 5:
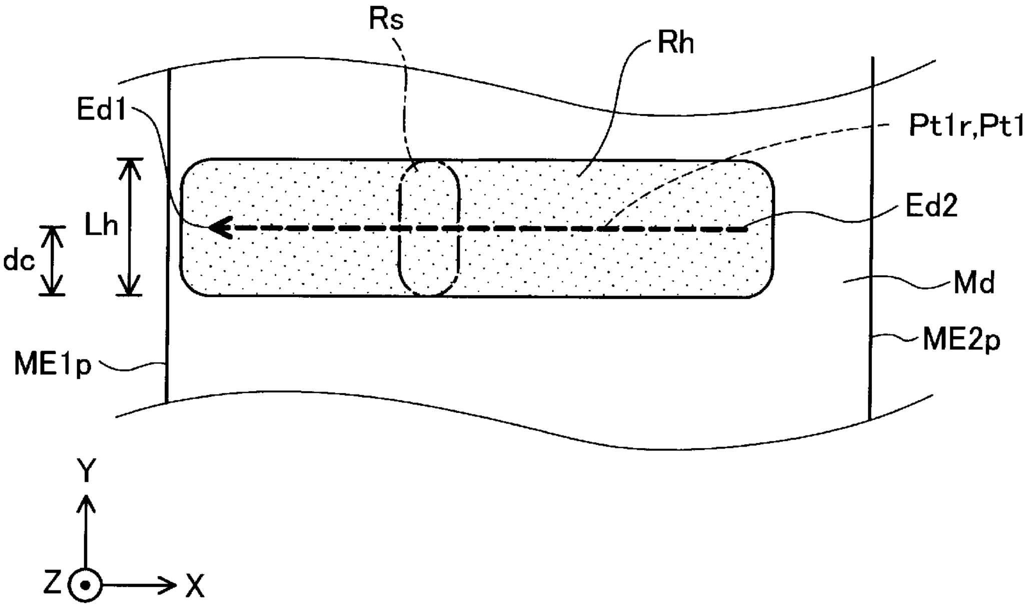
FIG. 5 is an explanatory view showing a heating region of the first electrode unit.

FIG. 5 is an explanatory view showing a heating region Rh of the first electrode unit 30 according to the present embodiment. In FIG. 5, the heating region Rh is hatched with a dot pattern. The heating region Rh refers to a region on the medium Md that is heated by the first electrode unit 30 while one stationary operation is executed. As viewed along the Z direction, the heating region Rh is a band-shaped region along the X direction drawn by moving the region Rs, which is a region on the medium Md heated by the stationary first electrode unit 30, as the carriage 120 scans. As viewed along the Z direction, the region Rs according to the present embodiment corresponds to a portion positioned between the first electrode 31 and the second electrode 32. The "portion between the first electrode 31 and the second electrode 32" includes a portion where the first electrode 31 or the second electrode 32 are provided. According to the present embodiment, the shape and placement of the first electrode unit 30 and the transporting distance dc are set such that the length Lh of the heating region Rh in the X direction is an integral multiple of the transporting distance dc. More specifically, according to the present embodiment, the length Lh is twice the transporting distance dc. The length Lh according to the present embodiment is substantially equal to the outer dimension of the second electrode 32 in the X direction.

Figure 6:
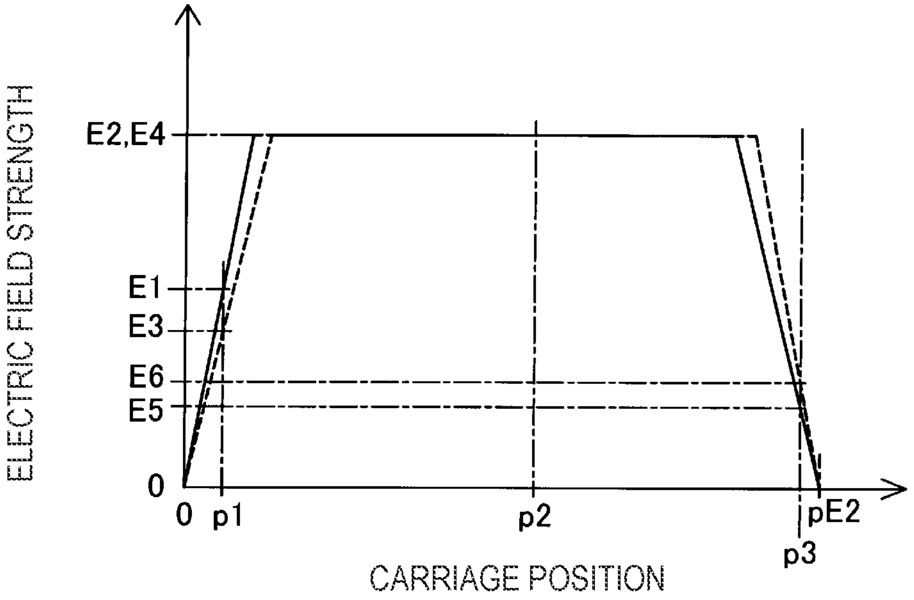
FIG. 6 is an explanatory view showing a relationship between carriage position and electric field strength according to the first embodiment.
Figure 7:
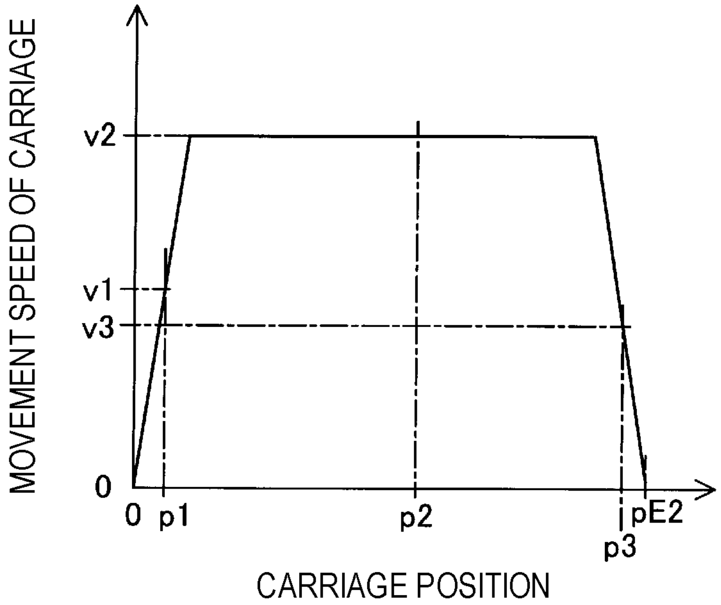
FIG. 7 is an explanatory view showing a relationship between carriage position and movement speed according to the first embodiment.

FIG. 6 is an explanatory diagram showing the relationship between the carriage position and the electric field strength of the electrode units 20 in the heating control executed according to the present embodiment. FIG. 7 is an explanatory diagram showing the relationship between the carriage position and a movement speed of the carriage 120 in the heating control executed according to the present embodiment. FIG. 6 is a graph in which the horizontal axis represents the position of the first electrode unit 30 along the first movement path Pt1 and the vertical axis represents the electric field strength. The horizontal axis in FIG. 6 represents the position coordinates of the first electrode unit 30 when the position coordinates of the end Ed1 of the first movement path Pt1 are set to zero. A large value on the horizontal axis in FIG. 6 means that the first electrode unit 30 is positioned further toward the +X direction side as viewed from the end Ed1. In FIG. 6, the electric field strength formed by the first electrode unit 30 is indicated by a solid line, and the electric field strength formed by the second electrode unit 40 is indicated by a dashed line. Similarly, FIG. 7 is a graph in which the horizontal axis represents the position of the first electrode unit 30 on the movement path Pt and the vertical axis represents a magnitude of the movement speed of the carriage 120. The movement speed of the carriage 120 at a certain point in time is equal to the movement speed of the first electrode unit 30 and the movement speed of the second electrode unit 40 at that point in time. In FIGS. 6 and 7, a coordinate P1 of a first point P1, a coordinate p2 of a second point p2, a coordinate p3 of a third point p3, and a coordinate pE2 of an end Ed2 are shown. According to the present embodiment, the relationships shown in FIGS. 6 and 7 are similarly applied to both the first control and the second control.

In the heating control, the heating control section 180 sets the electric field strength formed by the first electrode unit 30 to a first electric field strength E1 when the first electrode unit 30 is positioned at the first point P1, and sets the electric field strength formed by the first electrode unit 30 to a second electric field strength E2 that is stronger than the first electric field strength E1 when the first electrode unit 30 is positioned at the second point P2. Further, as shown in FIG. 7, in the heating control, the heating control section 180 makes the movement speed v1 of the carriage 120 at the first point P1 lower than the movement speed v2 at the second point P2. According to another embodiment, the first movement speed may be zero.

In addition, according to the present embodiment, in heating control, when the first electrode unit 30 is positioned at the second point P1, the heating control section 180 sets the electric field strength formed by the second electrode unit 40 to a third electric field strength E3 and when the first electrode unit 30 is positioned at the first point P2, the heating control section 180 sets the electric field strength formed by the second electrode unit 40 to a fourth electric field strength E4, which is stronger than the third electric field strength E3. As shown in FIG. 6, according to the present embodiment, the first electric field strength E1 is stronger than the third electric field strength E3. Note that according to the present embodiment, the second electric field strength E2 and the fourth electric field strength E4 are the same. The third electric field strength E3 may be zero. In addition, according to another embodiment, the first electric field strength E1 may not be stronger than the third electric field strength E3, and in this case, the first electric field strength E1 may be zero.

As shown in FIG. 6, according to the present embodiment, in the heating control, when the first electrode unit 30 is positioned at the third point P3 overlapping with the other end section ME2, the heating control section 180 sets the electric field strength formed by the first electrode unit 30 to a fifth electric field strength E5, which is weaker than the second electric field strength E2. In addition, in the heating control, when the first electrode unit 30 is positioned at the third point P3, that is, when the second electrode unit 40 is positioned at the fourth point P4, the heating control section 180 sets the electric field strength formed by the second electrode unit 40 to a sixth electric field strength E6, which is weaker than the fourth electric field strength E4. The sixth electric field strength E6 is stronger than the fifth electric field strength E5. Further, as shown in FIG. 7, in the heating control, the heating control section 180 makes the movement speed v3 of the carriage 120 at the third point P3 lower than the movement speed v2. The fifth electric field strength E5 and the movement speed v3 may be zero. According to another embodiment, the sixth electric field strength E6 may not be stronger than the fifth electric field strength E5, and in this case, the sixth electric field strength E6 may be zero.

According to the dielectric heating device 100 according to the first embodiment described above, in the heating control, the heating control section 180 executes heating control, sets the electric field strength formed by the first electrode unit 30 to the first electric field strength E1 when the first electrode unit 30 is positioned at the one end section ME1 overlapping with one end P1 of the medium Md, and sets the electric field strength formed by the first electrode unit 30 to the second electric field strength E2 stronger than the first electric field strength E1 when the carriage 120 is positioned at the second point P2 overlapping with the center section MC of the medium Md, and causes the movement speed v1 of the first electrode unit 30 at the first point P1 to be slower than the movement speed v2 of the first electrode unit 30 at the second point P2. Accordingly, it is possible to further reduce the difference between the heating amount of the medium Md in the vicinity of the first point P1 where the movement speed of the first electrode unit 30 is slower and the length of time that is remains there is longer and the heating amount of the medium Md in the vicinity of the second point P2 where the movement speed of the first electrode unit 30 is faster and the length of time that it remains there is shorter. Therefore, it is possible to suppress variation in heating amount of the medium Md in the scanning direction.

According to the present embodiment, in the heating control, the heating control section 180 further executes heating control such that, sets the electric field strength formed by the first electrode unit 30 to the fifth electric field strength E5, which is lower than the second electric field strength E2, when the first electrode unit 30 is positioned at the third point P3 overlapping with the other end section ME2, and causes the movement speed v3 of the first electrode unit 30 at the third point P3 to be slower than the movement speed v2 of the first electrode unit 30 at the second point P2. Therefore, it is possible to further suppress variation in heating amount of the medium Md in the scanning direction.

In addition, according to the present embodiment, the second electrode 32 is disposed to surround the first electrode 31 as viewed along the Z direction, and the first electrode unit 30 includes the first coil 34 electrically connected in series to the first electrode 31 or the second electrode 32. According to such a configuration, it is possible to effectively increase the strength of the electric field that is generated between the first electrode 31 and the second electrode 32 and contributes to heating of the medium Md. Therefore, it is possible to more efficiently heat the medium Md by the first electrode unit 30.

In addition, according to the embodiment, the carriage 120 is further mounted with the second electrode unit 40 including the third electrode 41 and the fourth electrode 42, and the first electrode unit 30 and the second electrode unit 40 are arranged side by side in the X direction. Therefore, the medium Md can be efficiently dried by the first electrode unit 30 and the second electrode unit 40.

In addition, according to the present embodiment, further in the heating control, the heating control section 180 sets the electric field strength formed by the second electrode unit 40 to a third electric field strength E3 when the first electrode unit 30 is positioned at the first point P1, and sets the electric field strength formed by the second electrode unit 40 to a fourth electric field strength E4, which is stronger than the third electric field strength E3, when the first electrode unit 30 is positioned at the second point P2. Therefore, in the configuration including the second electrode unit 40, it is possible to further suppress variation in heating amount of the medium Md in the scanning direction.

In addition, according to the present embodiment, the first point P1 is positioned outside the movement range Rg2 of the second electrode unit 40 in the X direction, the second electrode unit 40 is positioned at the point Pi on the medium Md when the first electrode unit 30 is positioned at the first point P1, and in the heating control the heating control section 180 sets the strength of the electric field formed by the second electrode unit 40 to the third electric field strength E3 when the first electrode unit 30 is positioned at the first point P1. The first electric field strength E1 is stronger than the third electric field strength E3. According to such an aspect, it is possible to suppress the heating amount of the medium Md from being insufficient in the vicinity of the first point P1, which is difficult to heat by the second electrode unit 40. Therefore, it is possible to further suppress variation in heating amount of the medium Md in the scanning direction.

Note that according to the present embodiment, when the first electrode unit 30 is positioned at the third point P3, the second electrode unit 40 is positioned at the fourth point P4 outside the movement range Rg1 of the first electrode unit 30 on the medium Md. Then, in the heating control, when the first electrode unit 30 is positioned at the third point P3, the heating control section 180 sets the electric field strength formed by the second electrode unit 40 to the sixth electric field strength E6, which is stronger than the fifth electric field strength E5. Accordingly, it is possible to suppress the heating amount of the medium Md from being insufficient in the vicinity of the fourth point P4, which is difficult to heat by the first electrode unit 30. Therefore, it is possible to further suppress variation in heating amount of the medium Md in the scanning direction.

In addition, according to the embodiment, the transport section 320 that transports the medium Md in the −Y direction is provided, and the heating control section 180, which controls the transport section 320, alternately executes the transport operation of transporting the medium Md by the predetermined transporting distance dc and the stationary operation in which the medium is kept stationary without transporting the medium Md, and executes the heating control while the stationary operation is performed. The length Lh in the Y direction of the heating region Rh heated by the first electrode unit 30 while one stationary operation is executed on the medium Md is the integral multiple of the transporting distance dc. Therefore, it is possible to suppress a variation in the heating amount of the medium Md in the transport direction. By setting the length Lh to be twice or more the transporting distance dc, the same portion of the medium Md in the transport direction can be heated two or more times by the single electrode unit 20, and the heating amount of the medium Md per heating control can be reduced. Therefore, for example, the maximum voltage applied to the electrode units can be lowered. In addition, it is possible to prevent the temperature of the medium Md from becoming too high. In particular, in a case where the airflow generation section 140 is provided as in the present embodiment, by appropriately cooling the medium Md by the airflow generation section 140 while the heating control is repeated, it is possible to more effectively suppress that the medium Md becomes an excessively high temperature.

B. Second Embodiment

Figure 8:
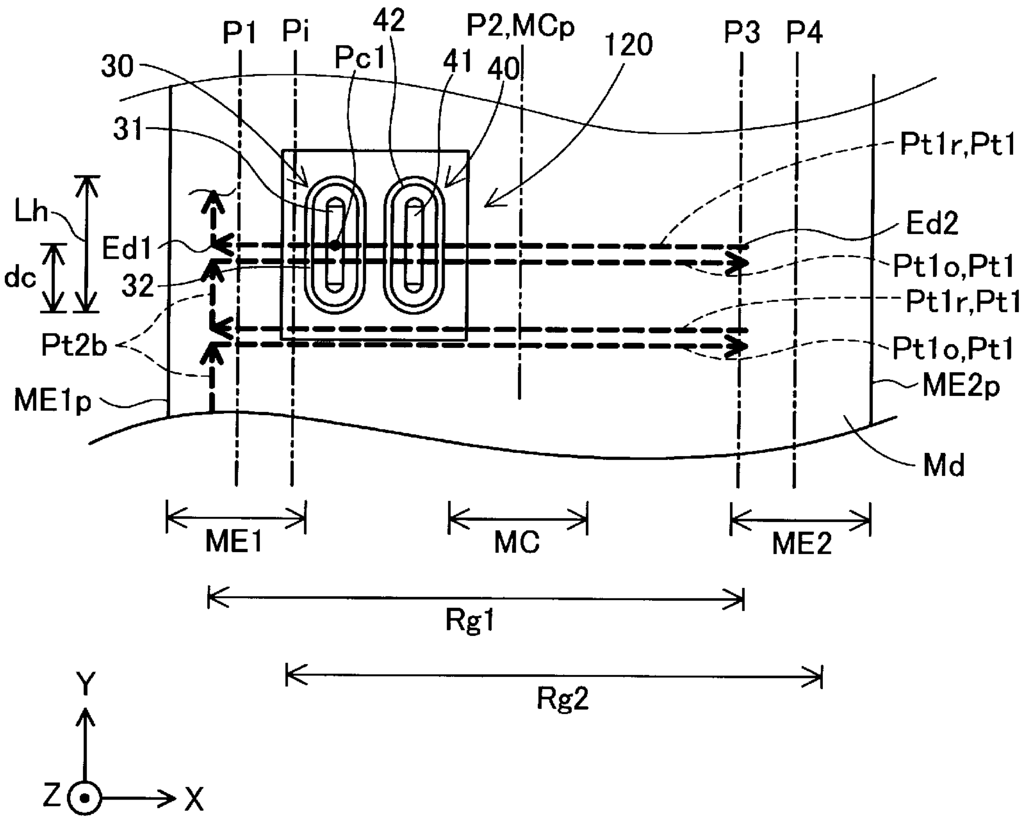
FIG. 8 is an explanatory view showing movement of the carriage according to a second embodiment.

FIG. 8 is an explanatory view showing the movement of the carriage 120 according to a second embodiment. According to the present embodiment, unlike the first embodiment, while one stationary operation is being executed, the heating control section 180 causes the first electrode unit 30 to reciprocally move along the scanning direction and executes the first control and the second control. In the configurations of the dielectric heating device 100 and the liquid ejection system 200 according to the second embodiment, portions that are not particularly described are the same as those in the first embodiment.

In FIG. 8, similarly to FIG. 4 described in the first embodiment, the first movement path Pt1 and the second movement path Pt2*b* are shown. As shown in FIG. 8, according to the present embodiment, while executing one stationary operation, the heating control section 180 executes each of the first control and the second control once. That is, while one stationary operation is executed, the first electrode unit 30 and the second electrode unit 40 perform one reciprocal movement together with the carriage 120. The heating control is executed in both the outgoing path and the return path. Therefore, according to the present embodiment, the second movement path Pt2*b* is constituted by only a path that connects the terminal end of the outgoing path Pt1*o* of the first movement path Pt1 and the return path Pt1*r* of the first movement path Pt1. In FIG. 8, in order to facilitate understanding of the technology, the outgoing path Pt1*o* and the return path Pt1*r* are illustrated to be shifted in the Y direction, but the outgoing path Pt1*o* and the return path Pt1*r* actually overlap each other.

According to the second embodiment described above, while executing one stationary operation, the heating control section 180 causes the first electrode unit 30 to reciprocally move along the X direction and executes the first control and the second control. Accordingly, for example, even when the length Lh is not set to twice or more the transporting distance dc as described in the first embodiment, the same portion of the medium Md can be easily heated two or more times by the one electrode unit 20, and the heating amount of the medium Md per heating control can be reduced. Therefore, for example, the maximum voltage applied to the electrode units 20 can be lowered. In addition, it is possible to prevent the temperature of the medium Md from becoming too high. In particular, in a case where the airflow generation section 140 is provided as in the present embodiment, by appropriately cooling the medium Md by the airflow generation section 140 while the heating control is repeated, it is possible to more effectively suppress that the medium Md becomes an excessively high temperature. By setting the length Lh to twice or more the transporting distance dc, the above described effect can be further enhanced.

In another embodiment, while executing one stationary operation, the heating control section 180 may execute the first control and the second control two or more times.

C. Third Embodiment

Figure 9:
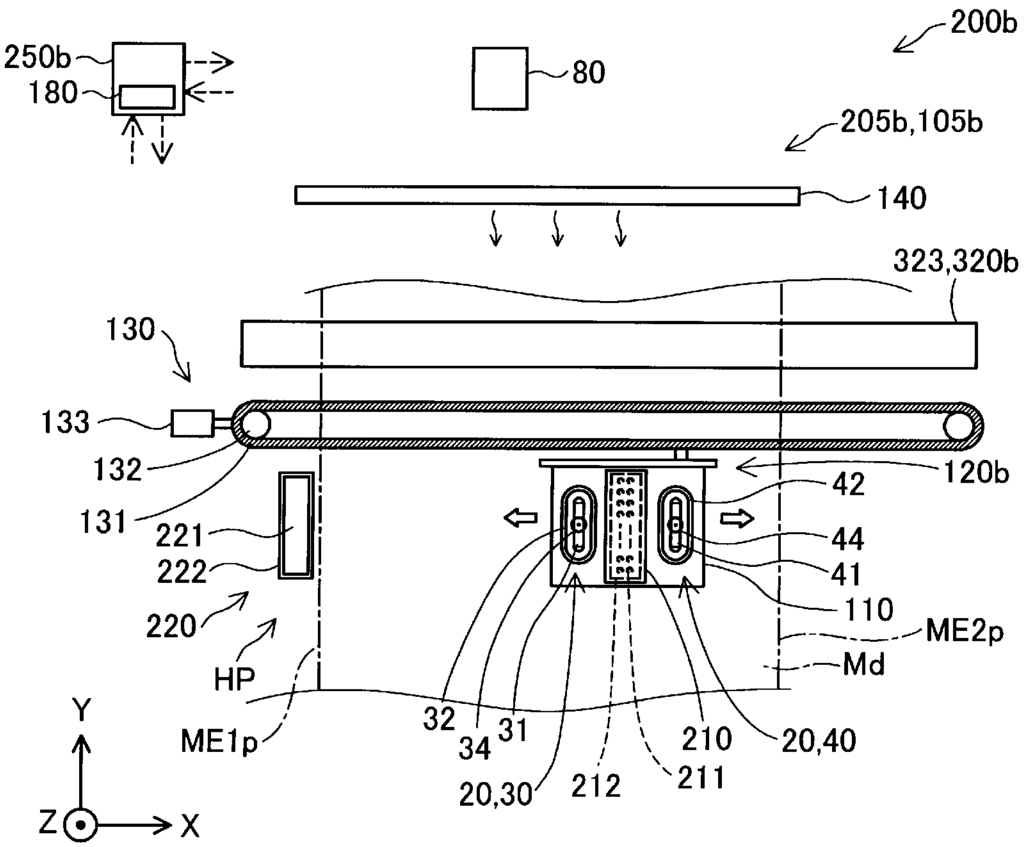
FIG. 9 is a top view showing a schematic configuration of the liquid ejection system according to a third embodiment.

FIG. 9 is a top view showing a schematic configuration of a liquid ejection system 200*b* according to a third embodiment. According to present embodiment, the electrode units 20 and the like are incorporated in a liquid ejection device 205*b*, and the liquid ejection device 205*b* also functions as a dielectric heating device 100*b*. According to present embodiment, unlike the first embodiment, a carriage 120*b* is has mounted thereon the liquid ejection section 210 in addition to the electrode units 20. Therefore, the moving section 130 causes the carriage 120*b* to reciprocally move the liquid ejection section 210 at least above the medium Md together with the electrode units 20. Also, according to the present embodiment, unlike the first embodiment, the liquid ejection system 200*b* includes a cap 220 (to be described later). In the configuration of the dielectric heating device 100*b* and the liquid ejection system 200*b* according to the third embodiment, portions that are not particularly described are the same as those in the first embodiment.

According to the present embodiment, the ejection control section 250*b* also functions as the heating control section 180. A transport section 320*b* does not include the first transport section 321 and the second transport section 322, but is configured as the transport section common to the liquid ejection device 205*b* and the dielectric heating device 100*b*. In the present embodiment, similarly to the first embodiment and the second embodiment, the ejection control section 250*b* intermittently transports the medium Md in the −Y direction by the transport section 320*b*.

As shown in FIG. 9, the first electrode unit 30 and the liquid ejection section 210 are disposed side by side in the X direction. More specifically, according to the present embodiment, the first electrode unit 30, the liquid ejection section 210, and the second electrode unit 40 are disposed side by side in this order from the −X direction side toward the +X direction side. That is, the liquid ejection section 210 is sandwiched between the first electrode unit 30 and the second electrode unit 40 in the X direction. As a result, either the first electrode unit 30 or the second electrode unit 40 is positioned behind the liquid ejection section 210 in both the outgoing path Pt1*o* and the return path Pt1*r* of the carriage 120 described with reference to FIG. 4 and the like. Therefore, in both the outgoing path Pt1*o* and the return path Pt1*r*, the liquid is ejected onto the medium Md by the liquid ejection section 210, and the liquid ejected onto the medium Md can be heated by the electrode unit 20 that is positioned behind the liquid ejection section 210. Therefore, the liquid can be efficiently ejected onto the medium Md, and the liquid ejected onto the medium Md can be more quickly heated and dried.

As shown in FIG. 9, the cap 220 is disposed at a home position HP of the liquid ejection section 210. The cap 220 according to the present embodiment includes a bottom section 221 having a rectangular plate shape and an edge section 222 provided upright vertically from four side portions of the bottom section 221, and has a concave shape opening toward the +Z direction. The cap 220 is configured to be movable up and down by a cap moving mechanism (not shown). The cap moving mechanism is configured by, for example, a spring mechanism that operates in conjunction with the movement of the carriage 120*b* to the home position HP, an elevating device that operates by drive of a motor, or the like. A liquid absorbing material made of, for example, a hydrophilic foam resin or the like may be disposed in the cap 220.

The home position HP is disposed on the −X direction side of the medium Md. Thus, the cap 220 is disposed on the −X direction side of the medium Md. In other words, the cap 220 is disposed outside the medium Md in the X direction. In the present embodiment, the home position HP also serves as a maintenance position, which is a position for maintaining the liquid ejection section 210.

Figure 10:
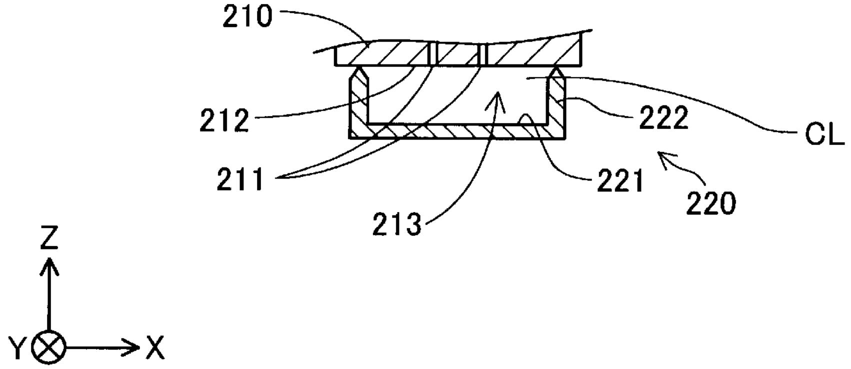
FIG. 10 is an explanatory view of capping by a cap.

FIG. 10 is an explanatory view of capping by the cap 220. The cap 220 is configured to be capable of capping the liquid ejection section 210. As shown in FIG. 10, "capping" means that the cap 220 covers at least a part of the ejection surface 213 of the liquid ejection section 210 so as to form a closed space CL in which the nozzle opening 211 is open between the cap and the ejection surface 213. More specifically, the cap 220 moves in the +Z direction toward the ejection surface 213 of the liquid ejection section 210 positioned at the home position HP by the cap moving mechanism described above, and forms the closed space CL by bringing an upper end section of the edge section 222 and the ejection surface 213 into intimate contact with each other. Hereinafter, a state in which the liquid ejection section 210 is capped may be referred to as a capping state.

Capping is executed, for example, in a state in which the liquid ejection section 210 is waiting without executing printing. Capping enables suppression of adhesion of a foreign substance to the ejection surface 213, drying of the liquid in the nozzle of the liquid ejection section 210, and the like. Suppression of drying of the liquid in the nozzle of the liquid ejection section 210 by capping may sometimes be referred to as "retaining moisture". In the capping state, for example, by appropriately retaining moisture in the cap 220, it is possible to enhance the moisture retaining effect.

Further, the cap 220 according to the present embodiment functions as a waste liquid receiving section for receiving the liquid ejected from the liquid ejection section 210 in the maintenance operation of the liquid ejection section 210. More specifically, the cap 220 serving as the waste liquid receiving section caps the liquid ejection section 210 that is performing a flushing operation, thereby storing the liquid ejected from the liquid ejection section 210 in the flushing operation. A flushing operation is not a printing operation that performs printing by ejecting the liquid onto the medium Md, but is an operation that is performed for maintenance of the liquid ejection section 210, and is an operation that suppresses the occurrence of eject defects due to an increase in the viscosity of the liquid in the nozzle, a flow path, or the like within the liquid ejection section 210 by continuously ejecting the liquid from the liquid ejection section 210 at the maintenance position.

According to another embodiment, for example, suction cleaning may be executed as the maintenance operation. Suction cleaning refers to an operation in which negative pressure is generated in the closed space CL in the capping state and air bubbles and foreign substances contained in the liquid are sucked together with the liquid from the liquid ejection section 210 through the nozzle of the liquid ejection section 210. In this case, the liquid ejection section 210 may include a suction pump, a tube, or the like for sucking the liquid in the closed space CL.

Figure 11:
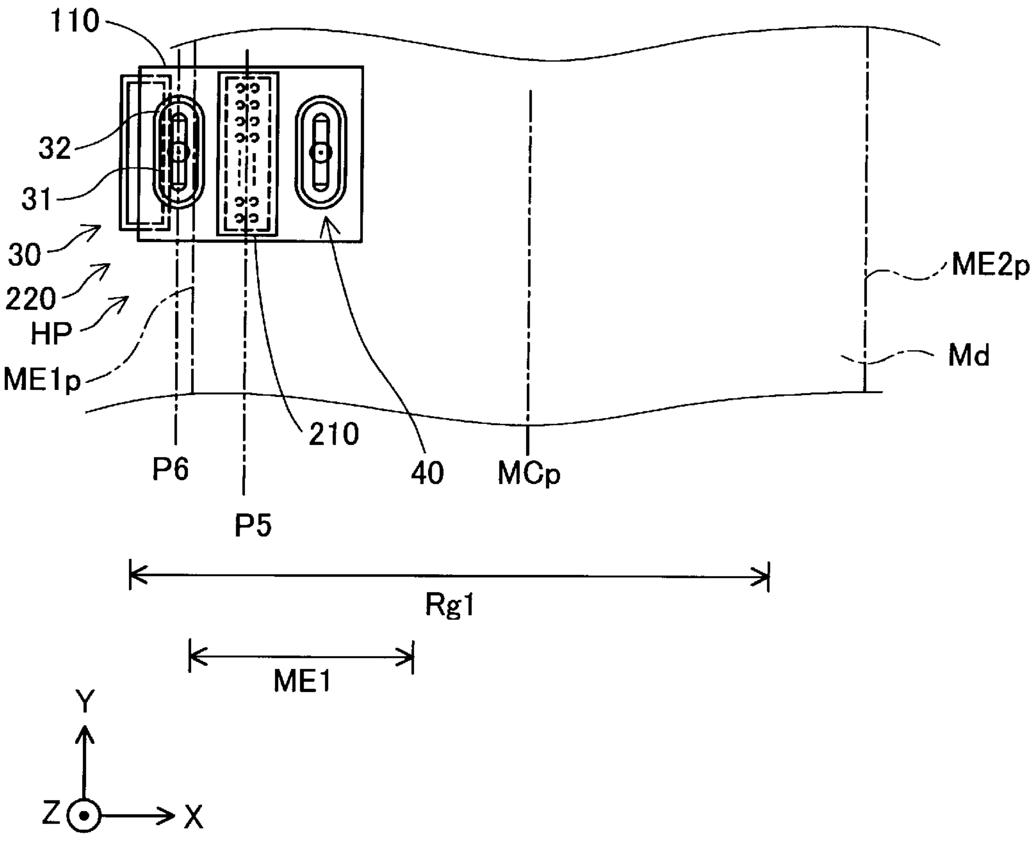
FIG. 11 is an explanatory view showing a positional relationship between the first electrode unit and the cap.

FIG. 11 is an explanatory view showing a positional relationship between the first electrode unit 30 and the cap 220. In FIG. 11, a portion of the cap 220 overlapping the substrate 110 and the electrode unit 20 as viewed along the Z direction is indicated by a dashed line. As shown in FIG. 11, according to the present embodiment, the end on the −X direction side of the movement range Rg1 of the first electrode unit 30 is positioned further to the −X direction side than the one end ME1*p* of the medium Md. According to the present embodiment, the cap 220 is disposed such that at least a portion thereof can be positioned between the first electrode 31 and the second electrode 32 as viewed along the Z direction. The "portion between the first electrode 31 and the second electrode 32" includes a portion where the first electrode 31 and the second electrode 32 are provided, similarly to the description with reference to FIG. 5. According to the present embodiment, for example, as shown in FIG. 11, when the liquid ejection section 210 is positioned at a fifth point P5 overlapping the one end section ME1, the first electrode unit 30 is positioned at a sixth point P6 on the −X direction side of the one end ME1*p*, and as viewed along the Z direction, at least a portion of the cap 220 is positioned between the first electrodes 31 and the second electrodes 32 of the first electrode unit 30 positioned at the sixth point P6.

Figure 12:
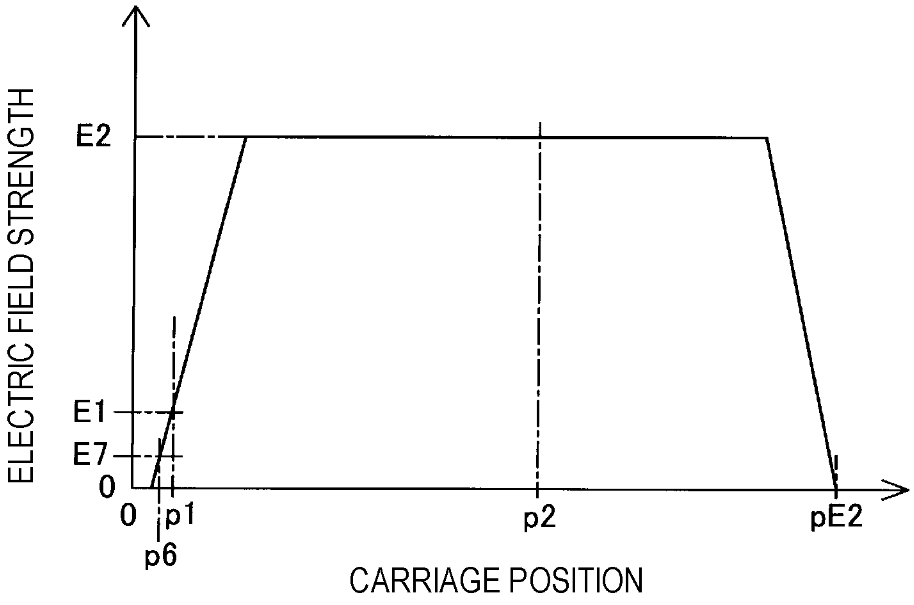
FIG. 12 is an explanatory view showing the relationship between carriage position and electric field strength according to the third embodiment.

FIG. 12 is an explanatory diagram showing the relationship between the carriage 120 position and the electric field strength of the electrode units 20 in the heating control executed according to the present embodiment. Similarly to FIG. 6 described in the first embodiment, FIG. 12 is a graph in which the horizontal axis represents the position of the carriage 120 on the first movement path Pt' and the vertical axis represents the electric field strength. According to present embodiment, the relationship shown in FIG. 12 applies to both the first control and the second control in the same manner. In FIG. 12, in addition to the coordinate p1, the coordinate p2, and the coordinate pE2, a coordinate p6 of the sixth point p6 is shown. According to the present embodiment, in the heating control, when the cap 220 is positioned between the first electrode 31 and the second electrode 32 as viewed along the Z direction, the heating control section 180 makes the strength of the electric field formed by the first electrode unit 30 weaker than the second electric field strength E2. For example, as shown in FIG. 12, in the heating control, when the first electrode unit 30 is positioned at the sixth point P6, the heating control section 180 sets the electric field strength formed by the first electrode unit 30 to a seventh electric field strength E7, which is weaker than the second electric field strength E2. According to the present embodiment, the seventh electric field strength E7 is weaker than the first electric field strength E1. The seventh electric field strength E7 may be zero.

According to another embodiment, even when the first electrode unit 30 is disposed on the −X direction side of the liquid ejection section 210 as according to the present embodiment, for example, by disposing the home position HP on the −X direction side, it is possible that in the heating control the cap 220 is not positioned between the first electrode 31 and the second electrode 32 when viewed along the Z direction. However, in this case, since the distance between the one end ME1*p* and the home position HP becomes larger, the time required for the liquid ejection portion 210 to move between the home position HP and the region on the media Md is further increased. According to the present embodiment, as described above, the cap 220 is disposed such that at least a part thereof is positioned between the first electrode 31 and the second electrode 32 as viewed along the Z direction in a part of the period during which the heating control is executed, and thus the home position HP can be disposed at a position closer to the medium Md.

According to the third embodiment described above, there is provided the cap 220 configured to be able to form the closed space CL between itself and the ejection surface 213 by covering at least a part of the ejection surface 213, the carriage 120*b* has mounted thereon the liquid ejection section 210, the first electrode unit 30 and the liquid ejection section 210 are disposed side by side in the X direction, the cap 220 is disposed such that at least a part of the cap 220 is positioned between the first electrodes 31 and the second electrodes 32 as viewed along the Z direction, and in the heating control, when the cap 220 is positioned between the first electrode 31 and the second electrode 32 as viewed along the Z direction, the heating control section 180 makes the strength of the electric field formed by the first electrode unit 30 weaker than the second electric field strength E2. Therefore, in a configuration in which the cap 220 is disposed such that at least a portion thereof can be positioned between the first electrode 31 and the second electrode 32 as viewed along the Z direction, it is possible to suppress the liquid adhering to the cap 220 from being heated by the first electrode unit 30, and to suppress the liquid adhering to the cap 220 and the cap 220 from becoming too high in temperature.

In addition, according to the embodiment, there is provided the waste liquid receiving section that receives the liquid ejected from the liquid ejection section 210 in the maintenance operation of the liquid ejection section 210, and at least part of the waste liquid receiving section is positioned between the first electrode 31 and the second electrode 32 as viewed along the Z direction during a part of the period during which the heating control is performed, and in the heating control, when at least part of the waste liquid receiving section is positioned between the first electrode 31 and the second electrode 32 as viewed along the Z direction, the heating control section 180 makes the strength of the electric field formed by the first electrode unit 30 weaker than the second electric field strength E2. Therefore, in a configuration in which the waste liquid receiving section is disposed such that at least a portion thereof can be positioned between the first electrode 31 and the second electrode 32 as viewed along the Z direction, it is possible to suppress the liquid adhering to the waste liquid receiving section from being heated by the first electrode unit 30, and to suppress the liquid adhering to the waste liquid receiving section and the waste liquid receiving section from becoming too high in temperature.

According to another embodiment, the home position HP and the maintenance position may be different positions, and in this case, the cap 220 and the waste liquid receiving section may be separate bodies. In this case, for example, the cap 220 and the waste liquid receiving section may be disposed side by side in the X direction, or the medium Md may be disposed so as to be sandwiched between the cap 220 and the waste liquid receiving section in the X direction. Further, only one of the cap 220 and the waste liquid receiving section may be provided. The waste liquid receiving section provided separately from the cap 220 may be configured as, for example, the storage section that stores the liquid ejected from the liquid ejection section 210, or may be configured as the flow path that receives the liquid ejected from the liquid ejection section 210 and guides the received liquid to another storage section. Also, for example, a cap 220 may be arranged at both the home position HP and the maintenance position, which are separated from each other.

D. Other Embodiments

D-1. According to the above embodiments, the heating control section 180 executes the heating control in both the outgoing path and the return path. On the other hand, the heating control section 180 may execute heating control only in one of the outgoing path and the return path. In other words, at least one of the first control and the second control may be executed. In this case, the heating control section 180 may heat the medium Md while moving the first electrode unit 30 in the +X direction along the outgoing path during the stationary operation, and may move the first electrode unit 30 in the −X direction along the return path without heating the medium Md during the transport operation, for example. In addition, the heating control section 180 may heat the medium Md by the electrode units 20 not only during the stationary operation but also during the transport operation, for example.

D-2. According to the above embodiments, the second electrode 32 is disposed so as to surround the first electrode 31 as viewed along the Z direction, but may not be disposed so as to surround the first electrode 31. For example, the first electrode 31 and the second electrode 32 may be disposed adjacent to each other as viewed along the Z direction. In this case, the shapes of the first electrode 31 and the second electrode 32 may be arbitrary, and may be circular shape, oval shape, rectangular shape, polygonal shape or the like. As viewed along the Z direction, the areas of the first electrode 31 and the second electrode 32 may be the same as or different from each other. As viewed along the Z direction, the first electrode 31 and the second electrode 32 are desirably arranged so as not to overlap each other. Similarly, the fourth electrode 42 may not be disposed so as to surround the third electrode 41.

D-3. According to the above embodiments, the first electrode unit 30 and the second electrode unit 40 are provided as the electrode units 20, however, for example, only the first electrode unit 30 may be provided. Three or more electrode units 20 including the first electrode unit 30 and the second electrode unit 40 may be provided. Arrangement of the electrode units 20 may be arbitrary.

D-4. According to the above embodiments, the first electric field strength E1 is stronger than the third electric field strength E3. On the other hand, the first electric field strength E1 may be weaker than the third electric field strength E3 or may be the same as the third electric field strength E3.

D-5. According to the above embodiments, the first point P1 is positioned outside the movement range Rg2 of the second electrode unit 40, but may be positioned inside the movement range Rg2.

D-6. According to the above embodiments, in the dielectric heating device 100, the heating control section 180 intermittently transports the medium Md by alternately executing the transport operation and the stationary operation, but the medium Md may not be intermittently transported. For example, the heating control section 180 may continuously transport the medium Md in the −X direction without stopping the medium Md at an intermediate position of the medium Md in the dielectric heating device 100.

D-7. According to the above embodiments, in the dielectric heating device 100, the medium Md is transported by the transport section 320, but the medium Md may not be transported. For example, the moving section 130 may be configured to be capable of not only reciprocally moving the carriage 120 in the X direction but also moving it along an intersecting direction, which intersects the X direction. Such a moving section 130 is configured by, for example, a two axis actuator or the like that moves the carriage 120 in the X direction and the Y direction. In this case, for example, the heating control section 180 may realize a movement path similar to the movement path of the carriage 120 in the intermittent transport described above by repeating an operation of moving the carriage 120 with respect to the medium Md by a predetermined distance in the +Y direction, which intersects the X direction and an operation of moving the carriage 120 with respect to the medium Md in the +X direction or the −X direction.

D-8. According to the above embodiments, the first electrode 31 has the boat-shape, but may not have the boat-like shape, and may have, for example, a plate-shape or a rod-like shape. In addition, the first electrode 31 may not have the oval shape as viewed along the Z direction, and may have, for example, a circular shape, a rectangular shape, another polygonal shape, or the like. Similarly, the third electrode 41 may not have the boat-shape, and may not have the oval shape as viewed along the Z direction.

D-9. According to the above embodiments, in the heating control, the heating control section 180, sets the electric field strength formed by the second electrode unit 40 to a third electric field strength E3 when the first electrode unit 30 is positioned at the first point P1 and sets the electric field strength formed by the second electrode unit 40 to a fourth electric field strength E4 that is stronger than the third electric field strength E3 when the first electrode unit 30 is positioned at the second point P2. Then, in the heating control, when the second electrode unit 40 is positioned at the fourth point P4, the heating control section 180 sets the electric field strength formed by the second electrode unit 40 to the sixth electric field strength E6, which is lower than the fourth electric field strength E4. On the other hand, the heating control section 180 may not control the electric field strength of the second electrode unit 40 in this manner. For example, in the heating control, among the above, the heating control section 180 may execute only setting the intensity of the electric field formed by the second electrode unit 40 to the fourth electric field strength E4 when the first electrode unit 30 is located at the second point P2 and setting the intensity of the electric field formed by the second electrode unit 40 to the sixth electric field strength E6 when the second electrode unit 40 is located at the fourth point P4. In addition, for example, in the heating control, the heating control section 180 may make the electric field strength of the second electrode unit 40 constant regardless of the position of the first electrode unit 30 or the second electrode unit 40 in the X direction.

D-10. According to the above embodiments, in the heating control, when the first electrode unit 30 is positioned at the third point P3 overlapping with the other end section ME2, the heating control section 180 sets the electric field strength formed by the first electrode unit 30 to a fifth electric field strength E5 that is weaker than the second electric field strength E2. On the other hand, the heating control section 180 does not need to control the electric field strength of the first electrode unit 30 in this manner as long as the control of setting the electric field strength formed by the first electrode unit 30 to the first electric field strength E1 and the control of setting the electric field strength formed by the first electrode unit 30 to the second electric field strength E2 when the first electrode unit 30 is located at the second point P2 are executed in the heating control.

D-11. According to the first embodiment and the second embodiment, the medium Md is consecutively transported from the liquid ejection device 205 to the dielectric heating device 100. When the medium Md is consecutively transported from the liquid ejection device 205 to the dielectric heating device 100 as described above, the transport section 320 may include, for example, only the transport section common to the dielectric heating device 100 and the liquid ejection device 205. In addition, the medium Md may not be consecutively transported from the liquid ejection device 205 to the dielectric heating device 100. For example, after the medium Md to which the liquid is applied by the liquid ejection device 205 is once wound-up in a roll-shape, the medium Md may be moved to the dielectric heating device 100 by a robot or the like. In this case, in the dielectric heating device 100, for example, it is possible to heat the medium Md while transporting the medium Md by the second transport section 322 or the like while unwinding the medium Md wound in the roll-shape.

D-12. According to the above embodiments, frequency of 13.56 MHz are used as the drive frequency $f_0$. In contrast, the frequency of 13.56 MHz may not be used as the drive frequency $f_0$, and for example, frequency of 40.68 MHz, 2.45 GHz, 5.8 GHz, and the like, which are other ISM bands, may be used. The drive frequency $f_0$ may not be high frequency as long as the liquid adhering to the medium Md can be heated by the electrode units 20. In this case, the drive frequency $f_0$ is desirably 100 kHz or more and less than 1 MHz, for example.

D-13. According to the above embodiments, the dielectric heating device 100 is incorporated in the liquid ejection system 200. On the other hand, the dielectric heating device 100 may not be incorporated in the liquid ejection system 200, and for example, only the dielectric heating device 100 may be used alone.

E. Reference Example

Figure 13:
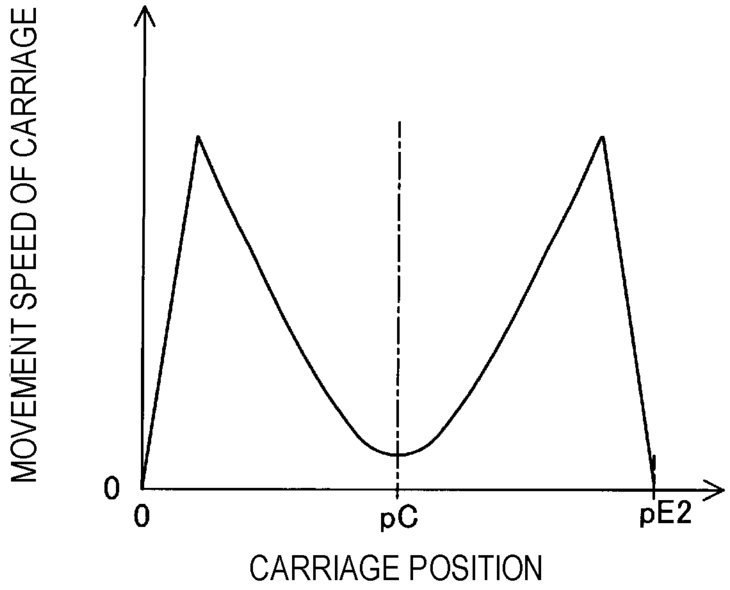
FIG. 13 is an explanatory view showing the relationship between carriage position and movement speed in the reference example.

E-1. FIG. 13 is an explanatory diagram showing a relationship in a reference example between the position of the carriage 120 and the movement speed of the carriage 120 while the medium Md is heated by the electrode units 20. Similarly to FIG. 7, FIG. 13 is a graph in which the horizontal axis represents the position of the first electrode unit 30 on the movement path Pt and the vertical axis represents the magnitude of the movement speed of the carriage 120. FIG. 13 shows the coordinates pC of the center point MCp and the coordinates pE2 of the other end ME2*p*. In the example of FIG. 13, in the heating control, the heating control section 180 controls the movement speed of the carriage 120 so that the amount of electric power per unit area applied to the medium Md by the first electrode unit 30 at the one end section ME1 of the medium Md and the amount of electric power per unit area applied to the medium Md by the first electrode unit 30 at the center section MC of the medium Md coincide with each other. In the example of FIG. 13, the heating control section 180 may, for example, make the electric field strength formed by the first electrode unit 30 constant on the movement path Pt in the heating control, alternatively, control both the intensity of the electric field formed by the first electrode unit 30 and the movement speed of the carriage 120 instead of making the intensity of the electric field formed by the first electrode unit 30 constant on the moving path Pt, so that the amount of electric power in the one end section ME1 and the amount of electric power in the center section MC coincide with each other as described above.

F. Other Forms

The present disclosure is not limited to the embodiments described above, but can be realized in various forms without departing from the scope of the present disclosure. For example, the present disclosure can also be realized by the following forms. The technical features in the above embodiments that correspond to the technical features in each aspect described below can be replaced or combined as appropriate to solve some or all of the issues of this disclosure or to achieve some or all of the effects of this disclosure. In addition, if a technical feature is not described as an essential feature in the present specification, the technical feature can be deleted as appropriate.

(1) According to a first aspect of the present disclosure, a dielectric heating device is provided.

A dielectric heating device includes a first electrode unit that has a first electrode and a second electrode facing a medium and that heats the medium by a dielectric heating method; a voltage applying section that applies an AC voltage to the first electrode and the second electrode; a carriage on which is mounted the first electrode unit; a moving section that causes the first electrode unit to reciprocally move at least above the medium along a scanning direction by reciprocating the carriage along the scanning direction; and a heating control section that controls the voltage applying section and the moving section, wherein the heating control section executes heating control of heating the medium while moving the first electrode unit along the scanning direction in at least one of an outgoing path in which the first electrode unit moves in one direction of the scanning direction and a return path in which the first electrode unit moves in a direction opposite to the one direction and in the heating control, the heating control section sets an electric field strength formed by the first electrode unit when the first electrode unit is positioned at a first point overlapping one end section of the medium in the scanning direction to a first electric field strength, sets an electric field strength formed by the first electrode unit when the first electrode unit is positioned at a second point overlapping a center section of the medium in the scanning direction to a second electric field strength that is stronger than the first electric field strength, and causes movement speed of the first electrode unit at the first point to be slower than movement speed of the first electrode unit at the second point.

According to such an aspect, it is possible to further reduce the difference between the heating amount of the medium in the vicinity of the first point where the movement speed of the first electrode unit is slower and the length of time that it remains there is longer and the heating amount of the medium in the vicinity of the second point where the movement speed of the first electrode unit is faster and the length of time that it remains there is shorter. Therefore, it is possible to suppress variations in the heating amount of the medium in the scanning direction.

(2) According to the above described aspect, the following configuration may be adopted.

the second electrode is disposed so as to surround the first electrode as viewed along a facing direction in which the first electrode and the second electrode face the medium, and the first electrode unit has a coil electrically connected in series to the first electrode or to the second electrode.

According to such an aspect, it is possible to effectively increase the intensity of the electric field which is generated between the first electrode and the second electrode and contributes to heating of the medium. Therefore, the medium can be heated more efficiently by the first electrode unit.

(3) According to the above described aspect, the following configuration may be adopted.

The dielectric heating device, further includes a second electrode unit that has a third electrode and a fourth electrode facing a medium and that heats the medium by a dielectric heating method, wherein the voltage applying section applies an AC voltage to the third electrode and to the fourth electrode, the carriage has mounted thereon the second electrode unit, the moving section causes the carriage to reciprocally move the second electrode unit together with the first electrode unit at least above the medium, and the first electrode unit and the second electrode unit are disposed side by side in the scanning direction.

According to such an aspect, the medium can be efficiently dried by the first electrode unit and the second electrode unit.

(4) According to the above described aspect, the following configuration may be adopted.

The first point is positioned outside a movement range of the second electrode unit in the scanning direction, when the first electrode unit is positioned at the first point, the second electrode unit is positioned above the medium, the heating control section, in the heating control, when the first electrode unit is positioned at the first point, the heating control section sets an electric field strength formed by the second electrode unit as a third electric field strength, and the first electric field strength is stronger than the third electric field strength.

According to such an aspect, it is possible to suppress the heating amount of the medium from being insufficient in the vicinity of the first point, which is difficult to heat by the second electrode unit. Therefore, variation in the heating amount of the medium in the scanning direction can be further suppressed.

(5) According to the above described aspect, the following configuration may be adopted.

A transport section that transports the medium in a transport direction, which intersects the scanning direction, wherein the heating control section includes controls the transport section, alternately executes a transport operation in which the medium is transported by the transport section for a predetermined transporting distance and a stationary operation in which the medium is kept stationary without being transported, and executes the heating control while executing the stationary operation and a length in the transport direction of a region on the medium that is heated by the first electrode unit while the stationary operation is executed once is an integral multiple of the transporting distance.

According to such an aspect, it is possible to suppress variation in the heating amount of the medium in the transport direction.

(6) According to the above described aspect, the following configuration may be adopted.

the heating control section causes the first electrode unit to reciprocate along the scanning direction while executing the stationary operation once, and executes the heating control in the outgoing path and in the return path.

According to such an aspect, the same portion of the medium can be easily heated two or more times by one electrode unit, and the heating amount of the medium per each time the heating control is performed can be reduced. Therefore, for example, the maximum voltage applied to the first electrode unit can be lowered. In addition, for example, it is possible to prevent the temperature of the medium from becoming too high.

(7) According to a second aspect of the present disclosure, a liquid ejection system is provided.

A liquid ejection system includes the dielectric heating device of the above embodiment; a liquid ejection section that has an ejection surface having a nozzle opening formed therein and that ejects and applies liquid onto the medium from the nozzle opening; and a ejection control section that controls the liquid ejection section.

(8) According to the above described the second aspect, the following configuration may be adopted.

the carriage has mounted thereon the liquid ejection section, the moving section causes the carriage to reciprocally move the liquid ejection section together with the first electrode unit at least above the medium, the liquid ejection system further includes a cap that is disposed outside the medium in the scanning direction and that is configured to, by covering at least a portion of the ejection surface, form a closed space in which the nozzle opening opens in between the cap and the ejection surface, the first electrode unit and the liquid ejection section are disposed side by side in the scanning direction, the cap is disposed such that at least a portion of the cap is positionable between the first electrode and the second electrode as viewed along a facing direction in which the first electrode and the second electrode face the medium, and the heating control section, in the heating control, weakens the electric field strength formed by the first electrode unit to be lower than the second electric field strength when at least a part of the cap is positioned between the first electrode and the second electrode as viewed along the facing direction.

According to such an aspect, in a configuration in which the cap is disposed such that at least a portion thereof can be positioned between the first electrode and the second electrode as viewed along the facing direction, it is possible to suppress the liquid adhering to the cap from being heated by the first electrode unit, and to suppress the liquid adhering to the cap and the cap from becoming too high in temperature.

(9) According to the above described the second aspect, the following configuration may be adopted.

The carriage has mounted thereon the liquid ejection section, the moving section causes the carriage to reciprocally move the liquid ejection section together with the first electrode unit at least above the medium, the liquid ejection system further includes a waste liquid receiving section that is disposed outside the medium in the scanning direction and that receives the liquid ejected from the liquid ejection section during a maintenance operation of the liquid ejection section, the first electrode unit and the liquid ejection section are disposed side by side in the scanning direction, the waste liquid receiving section is disposed such that at least a portion of the waste liquid receiving section is positionable between the first electrode and the second electrode as viewed along a facing direction in which the first electrode and the second electrode face the medium, and the heating control section, in the heating control, weakens the electric field strength formed by the first electrode unit to be lower than the second electric field strength when waste liquid receiving section is positioned between the first electrode and the second electrode as viewed along the facing direction.

According to such an aspect, in a configuration in which the waste liquid receiving section is disposed such that at least a portion thereof can be positioned between the first electrode and the second electrode as viewed along the facing direction, it is possible to suppress the liquid adhering to the waste liquid receiving section from being heated by the first electrode unit, and to suppress the liquid adhering to the waste liquid receiving section and the waste liquid receiving section from becoming too high in temperature.

(10) According to a third aspect of the present disclosure, there is provided a liquid ejection device that applies a liquid heated by the following electrode unit onto a medium.

The electrode unit includes a first electrode and a second electrode which are disposed to face the medium and to which an AC voltage is applied, and is mounted on a carriage configured to be able to reciprocate along a scanning direction, in a heating control for heating the medium in at least one of a outgoing path in which the electrode unit moves in one direction of the scanning direction together with the carriage and a return path in which the electrode unit moves in a direction opposite to the one direction, a first electric field strength formed by the electrode unit when the electrode unit is positioned at a first point overlapping one end section of the medium in the scanning direction is stronger than a second electric field strength formed by the electrode unit when the electrode unit is positioned at a second point overlapping a center section of the medium in the scanning direction, and the movement speed of the electrode unit at the first point is slower than the movement speed of the electrode unit at the second point. The liquid ejection device includes a transport section for transporting the medium in a direction, which intersects the scanning direction, a liquid ejecting section for ejecting and applying the liquid to the medium, and a control section for controlling the transport section and the liquid ejection section.

What is claimed is:

1. A dielectric heating device comprising:

a first electrode unit that has a first electrode and a second electrode facing a medium and that heats the medium by a dielectric heating method;

a voltage applying section that applies an AC voltage to the first electrode and the second electrode;

a carriage on which is mounted the first electrode unit;

a moving section that causes the first electrode unit to reciprocally move at least above the medium along a scanning direction by reciprocating the carriage along the scanning direction; and a heating control section that controls the voltage applying section and the moving section, wherein the heating control section executes heating control of heating the medium while moving the first electrode unit along the scanning direction in at least one of an outgoing path in which the first electrode unit moves in one direction of the scanning direction and a return path in which the first electrode unit moves in a direction opposite to the one direction and in the heating control, the heating control section sets an electric field strength formed by the first electrode unit when the first electrode unit is positioned at a first point overlapping one end section of the medium in the scanning direction to a first electric field strength, sets an electric field strength formed by the first electrode unit when the first electrode unit is positioned at a second point overlapping a center section of the medium in the scanning direction to a second electric field strength that is stronger than the first electric field strength, and causes movement speed of the first electrode unit at the first point to be slower than movement speed of the first electrode unit at the second point.

2. The dielectric heating device according to claim 1, wherein the second electrode is disposed so as to surround the first electrode as viewed along a facing direction in which the first electrode and the second electrode face the medium, and the first electrode unit has a coil electrically connected in series to the first electrode or to the second electrode.

3. The dielectric heating device according to claim 1, further comprising:

a second electrode unit that has a third electrode and a fourth electrode facing a medium and that heats the medium by a dielectric heating method, wherein the voltage applying section applies an AC voltage to the third electrode and to the fourth electrode, the carriage has mounted thereon the second electrode unit, the moving section causes the carriage to reciprocally move the second electrode unit together with the first electrode unit at least above the medium, and the first electrode unit and the second electrode unit are disposed side by side in the scanning direction.

4. The dielectric heating device according to claim 3, wherein the first point is positioned outside a movement range of the second electrode unit in the scanning direction, when the first electrode unit is positioned at the first point, the second electrode unit is positioned above the medium, the heating control section, in the heating control, when the first electrode unit is positioned at the first point, the heating control section sets an electric field strength formed by the second electrode unit as a third electric field strength, and the first electric field strength is stronger than the third electric field strength.

5. The dielectric heating device according to claim 1, further comprising:

a transport section that transports the medium in a transport direction, which intersects the scanning direction, wherein the heating control section controls the transport section, alternately executes a transport operation in which the medium is transported by the transport section for a predetermined transporting distance and a stationary operation in which the medium is kept stationary without being transported, and executes the heating control while executing the stationary operation and a length in the transport direction of a region on the medium that is heated by the first electrode unit while the stationary operation is executed once is an integral multiple of the transporting distance.

6. The dielectric heating device according to claim 5, wherein the heating control section causes the first electrode unit to reciprocate along the scanning direction while executing the stationary operation once, and executes the heating control in the outgoing path and in the return path.

7. A liquid ejection system comprising:

the dielectric heating device according to claim 1;

a liquid ejection section that has an ejection surface having a nozzle opening formed therein and that ejects and applies liquid onto the medium from the nozzle opening; and an ejection control section that controls the liquid ejection section.

8. The liquid ejection system according to claim 7, wherein the carriage has mounted thereon the liquid ejection section, the moving section causes the carriage to reciprocally move the liquid ejection section together with the first electrode unit at least above the medium, the liquid ejection system further includes a cap that is disposed outside the medium in the scanning direction and that is configured to, by covering at least a portion of the ejection surface, form a closed space in which the nozzle opening opens in between the cap and the ejection surface, the first electrode unit and the liquid ejection section are disposed side by side in the scanning direction, the cap is disposed such that at least a portion of the cap is positionable between the first electrode and the second electrode as viewed along a facing direction in which the first electrode and the second electrode face the medium, and the heating control section, in the heating control, weakens the electric field strength formed by the first electrode unit to be lower than the second electric field strength when at least a part of the cap is positioned between the first electrode and the second electrode as viewed along the facing direction.

9. The liquid ejection system according to claim 7, wherein the carriage has mounted thereon the liquid ejection section, the moving section causes the carriage to reciprocally move the liquid ejection section together with the first electrode unit at least above the medium, the liquid ejection system further includes a waste liquid receiving section that is disposed outside the medium in the scanning direction and that receives the liquid ejected from the liquid ejection section during a maintenance operation of the liquid ejection section, the first electrode unit and the liquid ejection section are disposed side by side in the scanning direction, the waste liquid receiving section is disposed such that at least a portion of the waste liquid receiving section is positionable between the first electrode and the second electrode as viewed along a facing direction in which the first electrode and the second electrode face the medium, and the heating control section, in the heating control, weakens the electric field strength formed by the first electrode unit to be lower than the second electric field strength when waste liquid receiving section is positioned between the first electrode and the second electrode as viewed along the facing direction.

* * * * *